US006915343B1

United States Patent
Brewer et al.

(10) Patent No.: US 6,915,343 B1
(45) Date of Patent: Jul. 5, 2005

(54) SYSTEM AND METHOD OF RUNNING DIAGNOSTIC TESTING PROGRAMS ON A DIAGNOSTIC ADAPTER CARD AND ANALYZING THE RESULTS FOR DIAGNOSING HARDWARE AND SOFTWARE PROBLEMS ON A NETWORK COMPUTER

(75) Inventors: James Arthur Brewer, Leander, TX (US); Sanjay Gupta, Austin, TX (US); Nicole Dawn Hartman, Austin, TX (US); Mark Alan Jacks, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 665 days.

(21) Appl. No.: 09/599,180

(22) Filed: Jun. 22, 2000

(51) Int. Cl.[7] ............................................. G06F 15/173
(52) U.S. Cl. ....................... 709/224; 709/223; 714/39; 714/48
(58) Field of Search ................................. 709/223, 224, 709/250; 710/100, 107; 714/48, 39

(56) References Cited

U.S. PATENT DOCUMENTS 6,122,693 A * 9/2000 Gutta et al. ................. 710/107
6,256,687 B1 * 7/2001 Ellis et al. ..................... 710/71
6,311,296 B1 * 10/2001 Congdon ..................... 710/102
6,467,053 B1 * 10/2002 Connolly et al. ............ 710/301
6,539,338 B1 * 3/2003 Pickereign et al. .......... 702/185
6,542,995 B2 * 4/2003 Heinrich et al. ............. 713/202

* cited by examiner

Primary Examiner—Patrice Winder
Assistant Examiner—Philip B. Tran
(74) Attorney, Agent, or Firm—Duke W. Yee; Joscelyn G. Cockburn; Stephen R. Tkacs (57) ABSTRACT

An computer program product and a method is presented for diagnosing hardware and software problems on a network computer through the use of a diagnostic adapter card. The diagnostic adapter card is installed in an open slot in the system bus and thus has access to all the network computer electronics and peripherals. Diagnostic programs are run and the results are logged. By analyzing these results, the source of the problem can be determined and reported for service or repair. The diagnostic adapter card contains its own processor, read only memory, random access memory, and interface logic for connecting to the system bus, a set of external wrap cables for peripheral connector testing, and an external reporting device. Some tests require use of a wrap cable to connect two or more ports together. Other tests, such as system bus timing or memory integrity, do not require the use of wrap cables.

16 Claims, 6 Drawing Sheets

FIG. 2

NETWORK COMPUTER WITH DIAGNOSTIC ADAPTER CARD

SYSTEM AND METHOD OF RUNNING DIAGNOSTIC TESTING PROGRAMS ON A DIAGNOSTIC ADAPTER CARD AND ANALYZING THE RESULTS FOR DIAGNOSING HARDWARE AND SOFTWARE PROBLEMS ON A NETWORK COMPUTER

BACKGROUND OF THE INVENTION

1. Technical Field

The present invention relates generally to an improved network computer and a system for diagnosing errors. Still more particularly, the present invention provides an apparatus and a method for automatically performing hardware and software diagnostics on a network computer.

2. Description of the Related Art

With the introduction of the personal computer there was a shift away from centralized, mainframe computing. It was quickly realized that personal computers had to be able to communicate and share resources; this resulted in the emergence of a variety of network technologies. Even with these technological advances, personal computing focused on the individual user rather than the business organization. The network computer (NC) evolved to help move the focus away from the individual and back to the organization. This has resulted in an important shift in the way computers are perceived and used within an organization.

Network computers are the conduits by which corporate resources are accessed. This shift in perspective from the individual to the organization affects the way that information is created, stored, and disseminated. The end result is greater online collaboration, coordination, and communication.

Network computers are configured differently than personal computers with an emphasis on shared resources, including data storage, as contrasted with individual resources, such as hard drives or floppy drives for local storage on a personal computer. As a minimum, a network computer contains a monitor, keyboard, mouse, network interface, and audio circuitry. Software support includes the Java virtual machine and runtime environment, the Java API class libraries, TCP/IP networking support, a web browser, email support, and multimedia support. The use of the Java Virtual Machine and Java Runtime Environment greatly enhances application security. In addition, network server security controls can be used to limit the access of individual users. As one of ordinary skill in the art will appreciate, although network computers commonly use Java as the language of choice, development of software for network computers could use a wide variety of programming environments.

The NC environment is based on centralized system software, thus lowering overall computing costs. This lower total cost of ownership is a primary consideration for organizations that deploy NCs. Because all software is installed and maintained on network servers, large organizations do not require the huge support staffs needed by those that deploy personal computers and workstations.

Despite the simplicity of the network computer, problems can occur both in hardware and software. Therefore, it would be advantageous to have a diagnostic apparatus and method to quickly determine the source of computer problems and to facilitate repair of these problems.

SUMMARY OF THE INVENTION

An apparatus and a method is presented for diagnosing hardware and software problems on a network computer through the use of a diagnostic adapter card. The diagnostic adapter card is installed in an open slot in the system bus and thus has access to all the network computer electronics and peripherals. Diagnostic programs are run and the results are logged. By analyzing these results, the source of the problem can be determined and reported for service or repair.

The diagnostic adapter card contains its own processor, read only memory, random access memory, and interface logic for connecting to the system bus, a set of external wrap cables for peripheral connector testing, and an external reporting device. Some tests require use of a wrap cable to connect two or more ports together. Other tests, such as PCI bus timing or memory integrity, do not require the use of wrap cables.

Depending on the nature of the problem and assuming the network connection is functional, tests may be run remotely by a system administrator. For some tests, local assistance may be required to install wrap cables. The diagnostic adapter card can also be used to monitor system performance over longer periods of time and help in the detection of intermittent system or software problems.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
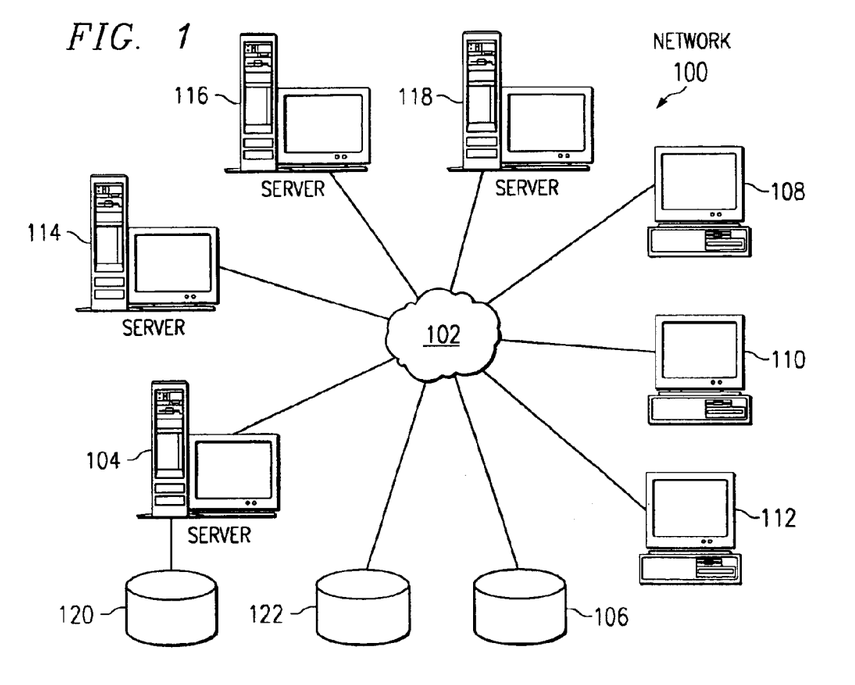
FIG. 1 is a pictorial representation of a distributed data processing system in which the present invention may be implemented.

With reference now to the figures, and in particular with reference to FIG. 1, a pictorial representation of a distributed data processing system is depicted in which the present invention may be implemented.

Distributed data processing system 100 is a network of computers. Distributed data processing system 100 contains network 102, which is the medium used to provide communications links between various devices and computers connected within distributed data processing system 100. Network 102 may include permanent connections, such as wire or fiber optic cables, or temporary connections made through telephone connections.

In the depicted example, servers 104, 114, 116 and 118 are connected to network 102. Storage units 106 and 122 are also connected to network 102, providing backup support for any or all of servers 104, 114, 116 and 118. Storage unit 122 provides dedicated backup support for server 104. In addition, network computers 108, 110 and 112 are also connected to network 102. For the purposes of this application, a network computer is any computer with a processor and boot code that is coupled to a network to receive its operating system and application software from the network. Distributed data processing system 100 may include additional servers, clients, and other devices not shown.

In the depicted example, servers 104, 114, 116 and 118 provide storage for data from network computers 108, 110 and 112. These four servers also provide data, such as boot files, operating system images, and applications to network computers 108, 110 and 112. Network computers 108, 110 and 112 are clients to one or all of servers 104, 114, 116 and 118. Support for a particular application being performed on one of network computers 108, 110 and 112 may be by one of servers 104, 114, 116 and 118. Additionally servers 104, 114, 116 and 118 may provide backup support for each other. In the event of a server failure, a redundant backup server may be allocated by the network administrator, in which case requests directed to the failed server are routed to the redundant backup server.

In a similar manner, storage units 106 and 122 provide data backup support for servers 104, 114, 116 and 118. However, rather than the network administrator allocating a data backup storage unit at each use, data backup allocation is set, and data backup transfer occurs at low usage times, typically after midnight, between any of servers 104, 114, 116 and 118 and storage units 106 and 122.

In the depicted example, distributed data processing system 100 may be the Internet, with network 102 representing a worldwide collection of networks and gateways that use the TCP/IP suite of protocols to communicate with one another. At the heart of the Internet is a backbone of high-speed data communication lines between major nodes or host computers consisting of thousands of commercial, government, education, and other computer systems that route data and messages. Of course, distributed data processing system 100 also may be implemented as a number of different types of networks, such as, for example, an intranet or a local area network.

FIG. 1 is intended as an example and not as an architectural limitation for the processes of the present invention.

Figure 2:
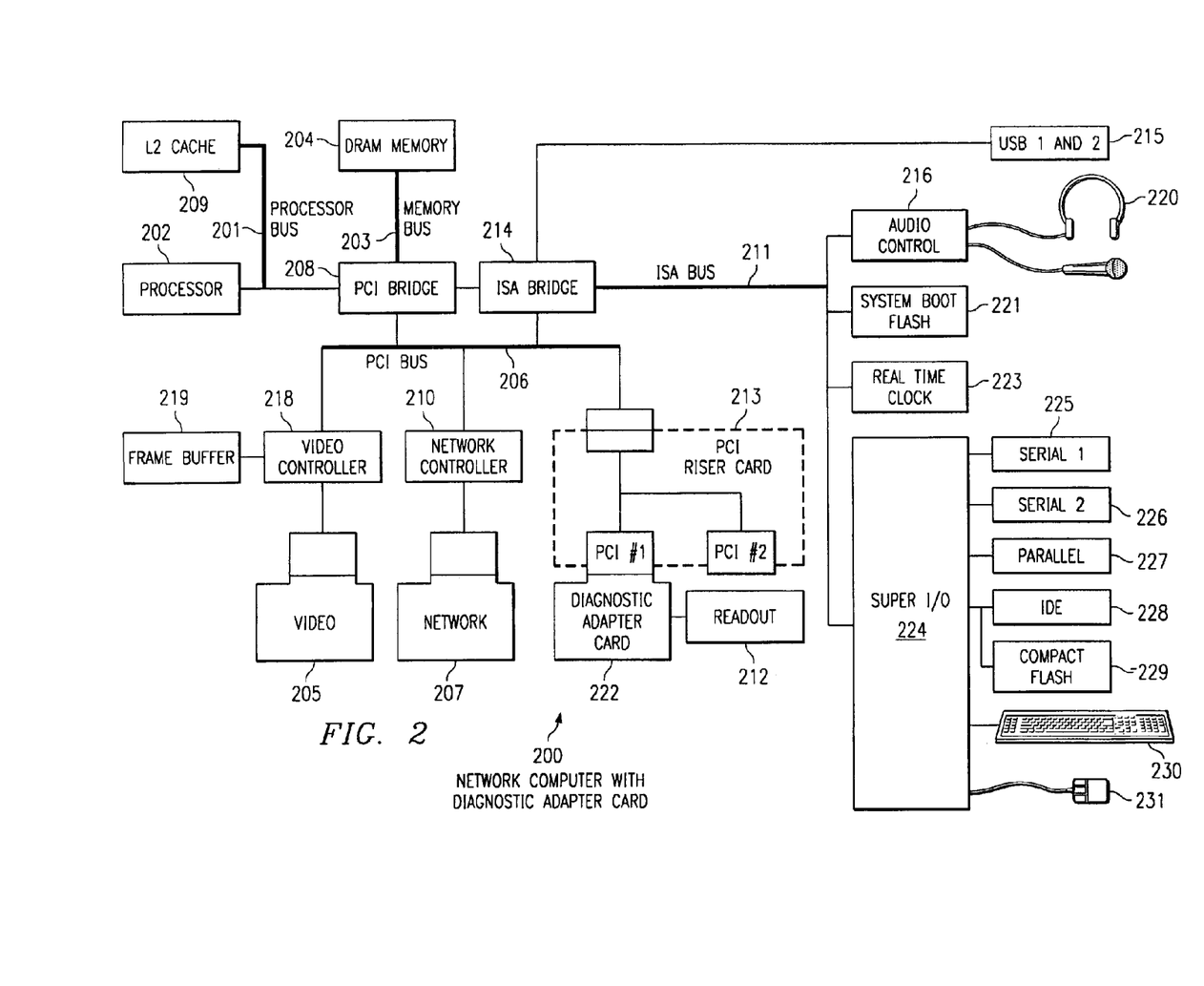
FIG. 2 is a block diagram of a network computer in which the present invention may be implemented.

With reference now to FIG. 2, a block diagram of a data processing system in which the present invention may be implemented is illustrated. Data processing system 200 is an example of a network computer. Data processing system 200 employs a peripheral component interconnect (PCI) local bus architecture and an ISA (Industry Standard Architecture) bus architecture. Processor 202 connects to PCI bridge 208 and L2 Cache 209 through processor bus 201. DRAM memory 204 is connected to PCI bridge 208 through memory bus 203. PCI bridge 208 may also include an integrated memory controller for processor 202.

Additional connections to PCI local bus 206 may be made through direct component interconnection or through add-in boards. In the depicted example, local area network (LAN) controller 210 connects to network 207. Video controller 218, assisted by frame buffer 219, controls video terminal 205. PCI Riser Card 213 contains two additional PCI slots. In this example, diagnostic adapter card 222 with associated Readout 212 are connected to one of these card slots.

PCI Bridge 208 connects to ISA Bridge 214, which is used to connect other I/O ports, including USB ports 1 and 2 215. Audio control 216 connects through ISA bus 211. The audio control connects to microphone 217 and headphone 220. As anyone skilled in the art will appreciate, a speaker could be added to the audio circuitry.

ISA bridge 214 connects via ISA bus 211 to System Boot Flash 221, Real Time Clock 223, and "Super I/O" 224. This "Super I/O" includes a variety of external ports: Serial 1 225, Serial 2 226, Parallel 227, IDE 228, Compact Flash 229, Keyboard 230, and Mouse 231.

An operating system runs on processor 202 and is used to coordinate and provide control of various components within network computer 200 in FIG. 2. In a network computer, the Java runtime environment and the Java virtual engine perform the functions commonly found in an operating system.

Those of ordinary skill in the art will appreciate that the hardware in FIG. 2 may vary depending on the implementation. For example, other peripheral devices may be used in addition to or in place of the hardware depicted in FIG. 2. The depicted example is not meant to imply architectural limitations with respect to the present invention. For example, the processes of the present invention may be applied to multiprocessor data processing systems.

Problems in a network computer environment might be caused by a hardware failure of a particular component, a software failure in the operating system, a software failure in a particular application, or a combination of these factors. It is important to identify and locate the problem quickly in order to minimize user frustration and lower maintenance costs.

The network station diagnostic adapter card plugs into the PCI bus so that it can access the electronics of the network computer. The adapter contains its own programming and electronics so that it can perform diagnostic functions even when there are hardware or software failures. Once installed, the diagnostic adapter card can also be left in the machine to collect data when the network computer is functioning properly. If problems are detected, the network administrator can be notified via the network adapter 207, if it is functional, via the video display 205, if it is functional, or via a set of diagnostic indicators 212 visible externally if the network interface and display are not functioning properly.

The diagnostic adapter card can perform a variety of hardware and software diagnostics. The PCI bus can be checked for timing and control problems, addressing problems, and data problems. In particular, direct memory access (DMA) and bus mastering operations can be performed. The system memory can be checked. Watchdog or timeout functions can be tested. The various input/output ports (serial port, parallel port, USB port, audio port, etc.) can be checked for integrity using data wrap cables when appropriate. The System Boot FLASH memory 221 can be verified and, if necessary, restored. As one of ordinary skill in the art will appreciate, this diagnostic testing could be adapted to a particular hardware and software environment.

Figure 3:
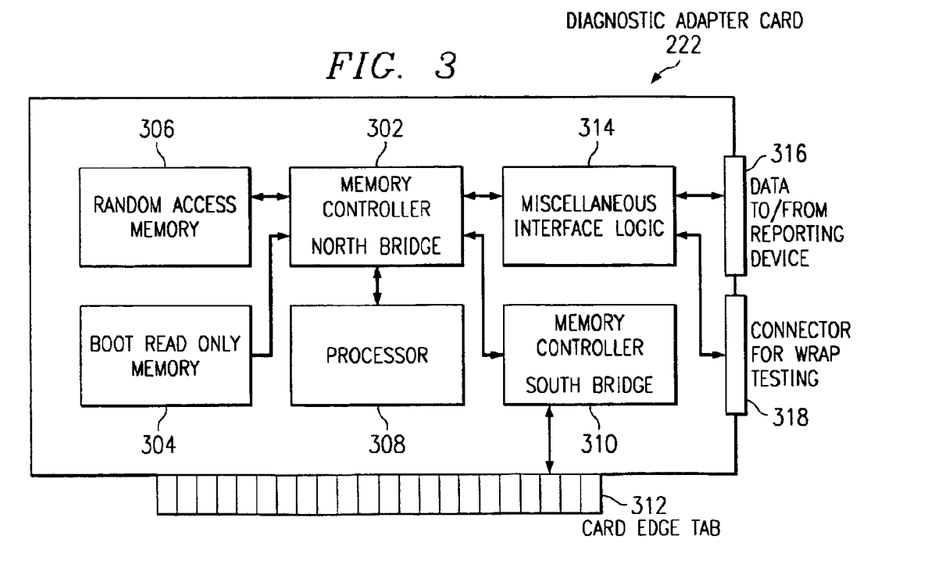
FIG. 3 is a block diagram for the diagnostic adapter card in accordance with a preferred embodiment of the present invention.

With reference now to FIG. 3, a block diagram is given for the diagnostic adapter card 222. The various components on diagnostic adapter card 222 communicate via Memory Controller North Bridge 302. In particular, the boot code is shadowed from Read Only Memory 304 into Random Access Memory (RAM) 306. In this way the boot code can be executed from RAM 306 without paying the performance penalty of booting directly from ROM 304. Data storage and retrieval uses Random Access Memory 306 under the control of Processor 308. By having memory and processing capabilities on the diagnostic adapter card, some diagnostic tests can often be performed even when the memory and/or processor in the network computer are defective. Simple diagnostic tests can be stored in ROM 304 but more complex diagnostic tests will be loaded in RAM 306 from the network, from flash memory, or from some other data source.

The diagnostic adapter card sends-signals to various devices in the computer via the PCI bus. In particular, Memory Controller North Bridge 302 sends and receives signals from Memory Controller South Bridge 310, which, in turn, communicates these signals using the PCI bus. Card edge tab 312 plugs into PCI riser 213.

Connectors are provided on the back of the diagnostic adapter card for two primary purposes: communicating test results and providing connections for certain types of wrap testing. Data can be transferred to or from reporting devices via connection 316, which interfaces through miscellaneous interface logic 314. This interface logic communicates with other components on the card via Memory Controller North Bridge 302. The reporting device may be a set of LED indicators, an LCD display, LED digital alphanumerics display, or any similar technology. It should be noted that results could also be reported via the a network adapter, such as network controller 210 in FIG. 2, if that portion of the network computer is working correctly. Results may also be reported via connector 318 along with use of an appropriate Network multi-drop wrap cable, if the diagnostic adapter card has network capabilities.

Some forms of testing require connections with wrap cables. For example, to test a network port, a multi-drop wrap cable needs to be installed connecting the network port to the external network connection and to the diagnostic adapter card. Connector 318, which is connected to interface logic 314, provides a way to monitor or connect to the network from the diagnostic adapter card via a multi-drop wrap cable. Using this multi-drop cable, the diagnostic adapter card can monitor and compare data sent out of or in to the network port with the external network connection. Additionally, even if the external network connection is not available, the diagnostic adapter card can communicate directly with the network port. If the external network connection is available, the diagnostic adapter card can communicate test results directly to a recipient connected to the external network.

To test the network port operation, a sequence of data can be sent to the network port via either the network server or the wrap cable. The network port can respond by sending a signal back to the network server or to the diagnostics card through the wrap cable or through the system PCI bus, depending on the circumstance. One particular test for network card integrity will be given in detail in FIGS. 6A and 6B below.

Figure 4A:
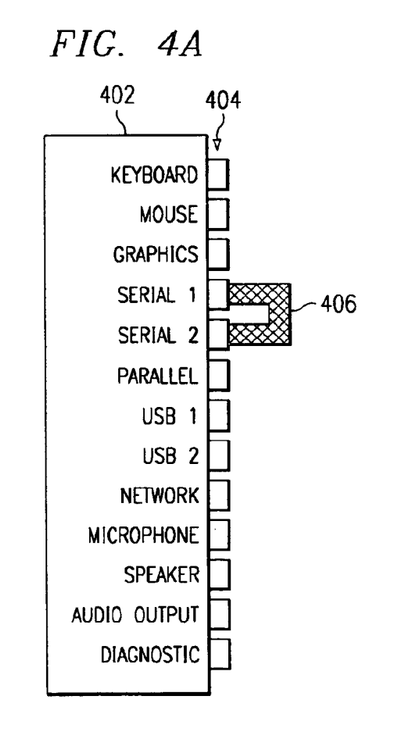
FIG. 4A shows the use of a serial port wrap cable in accordance with a preferred embodiment of the present invention.

With reference now to FIG. 4A, a block diagram shows the use of a serial wrap cable to test the serial ports. It is assumed network computer 402 has a variety of ports 404. In particular, it is assumed there are two serial ports, referenced as serial 1 and serial 2. Furthermore, to perform the diagnostic test on these ports, wrap cable 406 is used to connect these two ports. Serial ports are capable of both input and output. We will describe a test of sending a signal out of serial 1 and receiving it at serial 2, but, as will be appreciated by those of ordinary skill in the art, the test could easily be reversed with serial 2 sending a signal to serial 1.

Figure 4B:
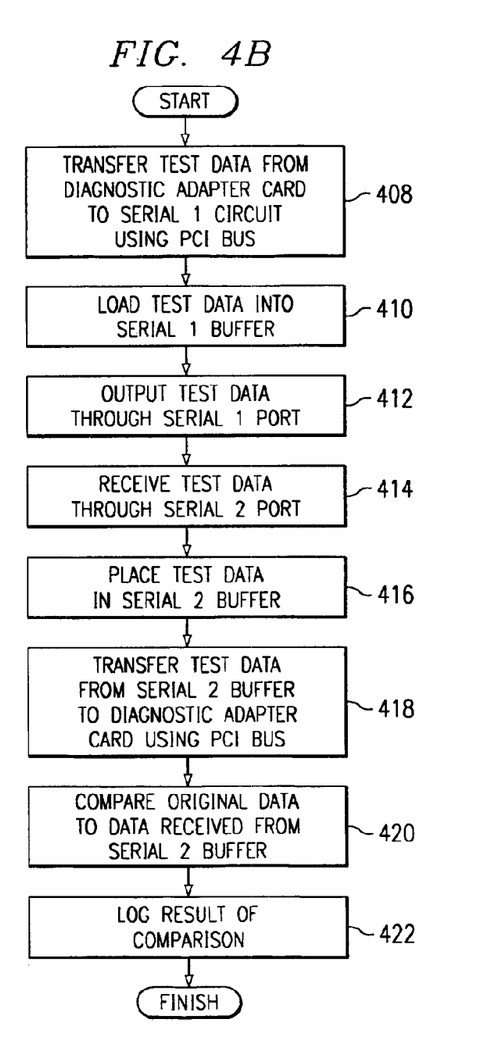
FIG. 4B gives a flowchart for the serial port test in accordance with a preferred embodiment of the present invention.

With reference now to FIG. 4B, a flow chart illustrates the steps in performing the serial port test. Using the PCI bus, which in this example is assumed to be functional, diagnostic adapter card 222 or system processor 202 transfers test data to the serial 1 circuit (step 408). This data transfer is via PCI bridge 208 and ISA bridge 214. The data is stored temporarily in the serial 1 buffer (step 410). Using the serial device control register, serial 1 circuit is instructed to output the data on serial 1 port (step 412). At the same time, serial 2 circuit has been instructed to receive data at serial port 2 (step 414). Wrap cable 406 is essential to complete this transfer. The received data is placed in serial 2 buffer (step 416). This data is then transferred back to the diagnostic adapter card via the PCI bus (step 418). The received data is compared with the original data (step 420), results of this comparison are logged (step 422), and appropriate success or failure test notification is posted to the diagnostics card readout, to the NC video display, or via the network connection.

For this particular test, 100% agreement in data would be expected for success and any discrepancy in data values, no matter how small, would represent failure. As one of ordinary skill in the art will appreciate, the nature of the comparison and the standard for "success" will be dependent on the device and type of data, as will be seen in the next test of audio data.

Figure 5A:
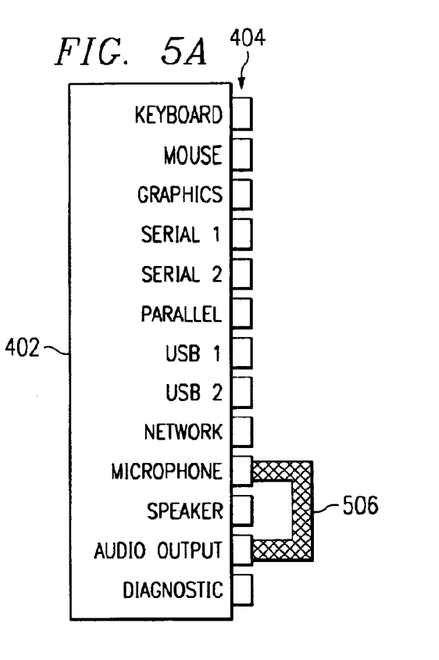
FIG. 5A shows the use of an audio port wrap cable in accordance with a preferred embodiment of the present invention.

With reference now to FIG. 5A, a block diagram shows the use of an audio wrap cable to test the audio circuits. It is assumed network computer 402 has a variety of ports 404. In particular, it is assumed the audio circuitry has a port for input from a microphone and a general audio output port. To perform one of the audio diagnostic tests, audio wrap cable 506 is used to connect the audio output port to the microphone port. Unlike the previous example for serial ports, these audio ports are unidirectional and are sending or receiving analog signals, as contrasted to digital signals.

Figure 5B:
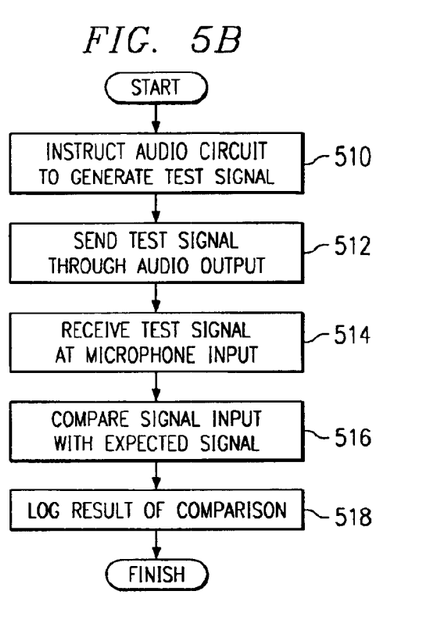
FIG. 5B gives a flowchart for the audio test in accordance with a preferred embodiment of the present invention.

With reference now to FIG. 5B, a flowchart illustrates the steps in performing the audio test for the audio output and microphone ports. Diagnostic card 300 sends a digital file via the PCI bus, the PCI bridge, and the ISA bridge to the audio circuitry where the digital file is converted, byte-by-byte, into analog data that generates an audio test signal (step 510). This test signal is sent to the audio output port (step 512). Audio Wrap cable 506 feeds this analog signal directly back to the microphone port, where the signal is received as analog input and converted to digital data (step 514). This digital signal is compared with the expected or original signal (step 516) and the result of this comparison is sent back to the diagnostic adapter card for logging (step 518). The received signal will be analyzed to insure appropriate frequency, phase, and voltage levels are being generated and properly received. The audio circuitry is considered to have passed the test only if the audio parameters fall within a predetermined percentage of the original signal; for instance, the audio input voltage is expected to be between 95% to 105% of the original audio output voltage.

As one of ordinary skill in the art will appreciate, a variety of different audio tests can be performed. Although the audio test described in FIG. 5 may be initiated remotely, a human user would need to be present to install the wrap cable.

Figure 6A:
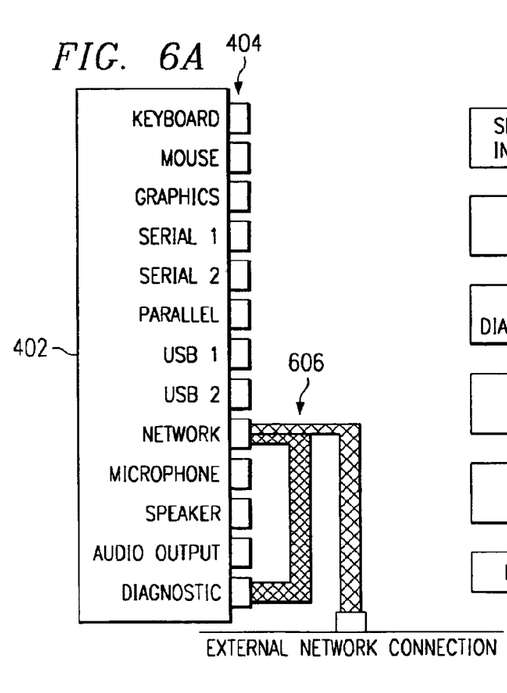
FIG. 6A shows the use of a multi-drop wrap cable between the network port, the external network connection, and the diagnostic port in accordance with a preferred embodiment of the present invention.

The next test involves the use of connector 318 on diagnostic adapter card 300. As seen in FIG. 6A, network computer 402 has a diagnostic adapter card installed, as evidenced by a diagnostic port among ports 404. To perform this test, the network data multi-drop wrap cable 606 is connected between the network port, the external network connection, and the diagnostic port. Network traffic that flows between the network port and the external network connection is monitored by the diagnostic port. A variety of network protocols, such as ethernet or token ring, can be accommodated by a test setup such as this.

Figure 6B:
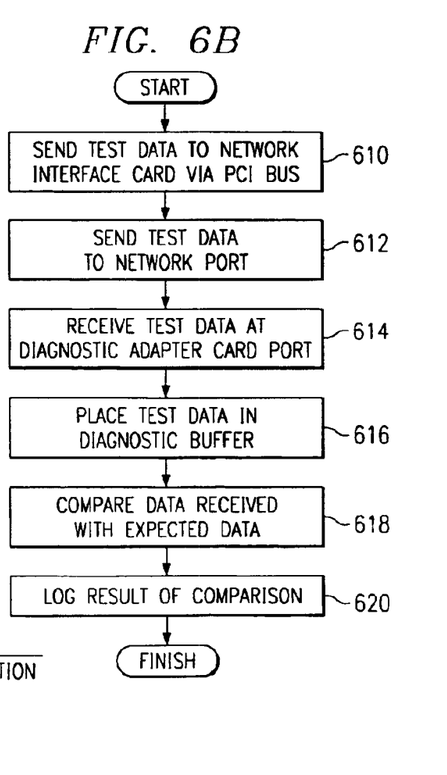
FIG. 6B gives a flowchart for the network circuitry test in accordance with a preferred embodiment of the present invention.

With reference now to FIG. 6B, a flowchart illustrates the steps in performing the network test. Using the PCI bus, diagnostic adapter card 300 transfers test data to the network interface circuitry (step 610). The data is then packaged according to the rules of the implemented network and sent to the network port (step 612). Wrap cable 606 transfers this data back to the diagnostic adapter card as well as sending it to the network server, if it is connected. The test data is received at the diagnostic adapter card (step 614) and placed in the diagnostic adapter card buffer (step 616). The received data is compared with the original data (step 618) and results of this comparison are logged (step 620). For this particular test, 100% agreement in data would be expected for success and any discrepancy in data values, no matter how small, would represent failure. As one of ordinary skill in the art will appreciate, the signal direction on this test could be reversed with either the diagnostic adapter card or the network server sending the test data on the network and the network circuitry receiving the data and sending it via the PCI bus to the diagnostic adapter card for analysis. This wrap cable also enables the Diagnostic Card to communicate directly with the network server to pass on test results and conclusions.

Figure 7A:
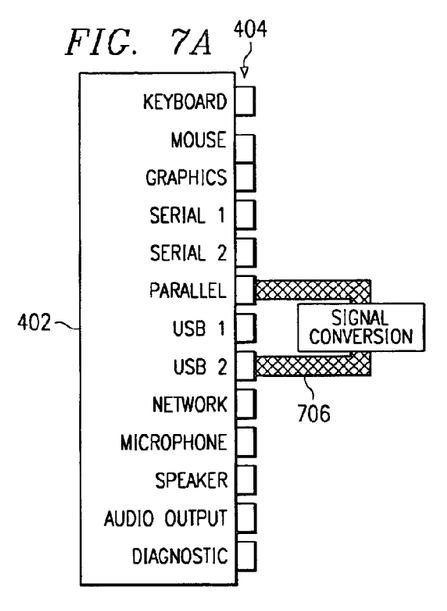
FIG. 7A shows the use of a wrap cable between a USB (Universal Serial Bus) port and a parallel port in accordance with a preferred embodiment of the present invention.

With reference now to FIG. 7A, a block diagram shows the use of a wrap cable to test data transfer from a USB (Universal Serial Bus) port to a parallel port. It is assumed network computer 402 has at least one parallel port and one USB port among the variety of ports 404. To perform this diagnostic test, wrap cable 706 is used to connect these two ports. Since both ports are bi-directional, the data transfer could be tested in either direction. We will describe a test of sending a signal out of USB 2 and receiving it at the parallel port, but, as will be appreciated by those of ordinary skill in the art, the test could easily be reversed with the parallel port sending data to USB 2. What makes this situation different than the serial to serial test described in FIG. 4 is that the wrap cable is "active," in the sense that it converts a bit-serial signal to a bit-parallel signal or vice versa depending on the direction of transfer.

Figure 7B:
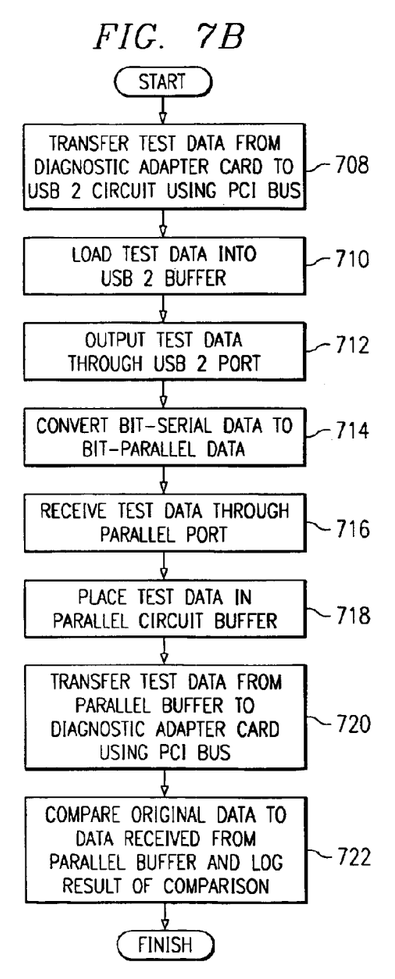
FIG. 7B gives a flowchart for the USB to parallel port test in accordance with a preferred embodiment of the present invention.

With reference now to FIG. 7B, a flowchart illustrates the steps in performing the USB to parallel test. Using the PCI bus, diagnostic adapter card 300 transfers test data to the USB 2 circuit (step 708). This data transfer is via PCI bridge 208 and ISA bridge 214. The data is stored temporarily in the USB 2 buffer (step 710). Using the USB controller device register, the USB 2 circuit is instructed to output data on the USB 2 port (step 712). Wrap cable 706 converts this bit-serial signal to a bit-parallel signal (step 714) before receipt at the parallel port (step 716). The received data is placed in the parallel received data buffer (step 718). This data is then transferred back to the diagnostic adapter card via the PCI bus (step 720). The received data is compared with the original data and results of this comparison are logged (step 722). For the test to be successful, the received parallel data must compare "exactly" to the USB transmitted data.

Figure 8:
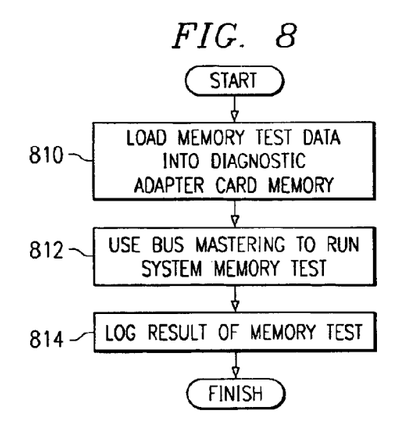
FIG. 8 gives a flowchart for a test of system memory in accordance with a preferred embodiment of the present invention.

Not all tests performed by the diagnostic adapter card require the temporary installation of wrap cables. FIG. 8 gives a flowchart for one such test, a test of system memory. The memory test data is loaded into the diagnostic adapter card memory (step 812). Using bus mastering, the diagnostic adapter card carries out the memory test (step 814) as a sequence of memory write and read commands to the NC system memory. Performing a memory test requires access to Memory Bus 203 via PCI bridge 208. The results of the memory test are logged (step 816) and success determined based on whether the data read back from memory exactly compared to the data written to memory.

This flowchart is deceptively simple since it does not specify the details of the memory test performed. As one of ordinary skill in the art will appreciate, there are a wide variety of memory test programs. Some of the common tests are a "walking ones" address pattern, the "Modulo-X" algorithm where X is an appropriately selected small integer, the "own address" test, the "walking ones" with inversion, and so forth. The diagnostic adapter card will contain tests appropriate to detect both "hard" memory errors and intermittent or "soft" memory errors.

Figure 9:
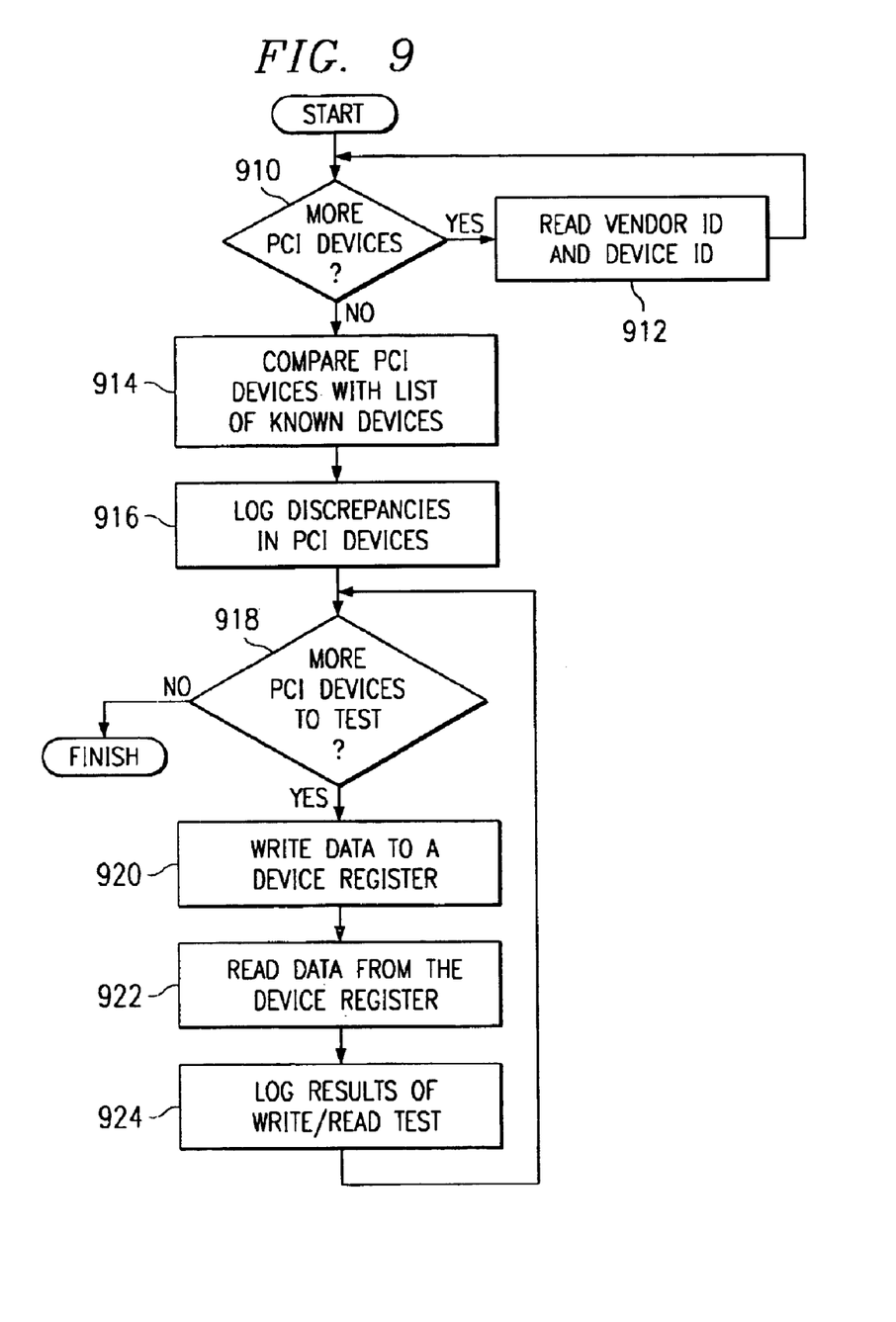
FIG. 9 gives a flowchart for testing devices connected to the PCI bus in accordance with a preferred embodiment of the present invention.

With reference now to FIG. 9, a flowchart illustrates the steps in performing a test of devices connected to the PCI bus. Although the steps discuss devices connected to a PCI bus, a similar test could be designed for other bus architectures. This test has three major components: gathering information about devices connected to the bus, comparing this information with a list of known devices, and then testing the control registers and data registers for each device.

The first step is to discover what devices are currently attached to the bus. If there are no other devices to be discovered (step 910: no), then control transfers to step 914 to continue testing each device individually. If there are more devices on the bus (step 910: yes), then the next vendor ID and device ID are read and added to the list of devices (step 912). Control transfers to step 910 and this process continues until all devices have been discovered.

The list of discovered devices is compared with a list of known devices (step 914). Any discrepancies between the two lists are logged (step 916). Devices connected to a PCI bus usually contain control registers, status registers, and data registers. Typically control and data registers can be written to and read from. The next stage of testing is to see if these registers are accessible and can be changed.

If there are more devices to be tested (step 918: yes), then the diagnostic adapter card will write a known pattern of data to a device register via the PCI bus (step 920). These patterns will be carefully chosen so that they do not disrupt the device or cause undesirable behavior. The device register will be read to verify the register is readable and writeable (step 922). The results are logged for each register tested (step 924). When all the devices are tested (step 918: No), the PCI bus test is completed and results may be presented via any one of the output mechanisms supported by the diagnostics adapter.

FIGS. 4–9 have presented a sampling of tests and do not imply limitations to only tests of these types. Nor do they imply the order in which the tests are performed. For example, the test of communications with devices on the PCI bus given in FIG. 9 would normally be performed before other tests that assume a functional PCI bus, such as tests given in FIGS. 4–8. Other tests may log data during normal operation of the network computer over an extended period of time. It should also be obvious that test programs can be loaded into the diagnostic adapter card via either the NC network connection and PCI bus or via a direct network connection using the multi-drop wrap cable. By using the diagnostic adapter card, the nature of the hardware and/or software problems can be quickly and accurately identified, thus minimizing the system downtime and reducing the overall maintenance costs.

The description of the present invention has been presented for purposes of illustration and description but is not intended to be exhaustive or limited to the invention in the form disclosed. Many modifications and variations will be apparent to those of ordinary skill in the art. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method in a network computer for diagnosing a problem, the method comprising the steps of:

running diagnostic testing programs on a diagnostic adapter card coupled to the network computer;

reporting the results from running the diagnostic testing programs; and analyzing the results from running the diagnostic testing programs to determine a cause of the problem, wherein analyzing the results from running the diagnostic testing programs includes one of detecting an absence of a response from a component, detecting a discrepancy between an expected response and an actual response, recognizing errors in signal timing, detecting a nonfunctioning component, detecting an intermittently failing component, and detecting a faulty software program.

2. The method of claim 1, wherein the diagnostic adapter card is coupled to the network computer by way of an open slot an a PCI (Peripheral Component Interconnect) bus in the network computer.

3. The method of claim 1, wherein running diagnostic testing programs includes running a program to test one of bus timing, bus mastering, direct memory access operations, data and control registers associated with devices connected to a system bus, system memory, timeout functions, a boot flash monitor, input/output integrity for one or more devices selected from a keyboard, a mouse, a graphics adapter, a serial port, a parallel port, a universal serial bus port, a microphone, a speaker, and an audio output port.

4. The method of claim 1, wherein reporting results includes one of sending data to a remote workstation, storing information in a log file, and displaying a result code on a display device connected to the diagnostic adapter card.

5. An apparatus in a network computer for diagnosing a problem, the apparatus comprising:

a processing means for executing diagnostic testing programs on the diagnostic adapter card;

a reporting means for reporting results from executing the diagnostic testing programs;

an analyzing means for analyzing the results from executing the diagnostic testing programs to determine a cause of the problem, wherein analyzing the results from running the diagnostic testing programs includes one of detecting an absence of a response from a component, detecting a discrepancy between an expected response and an actual response, recognizing errors in signal timing, detecting a nonfunctioning component, detecting an intermittently failing component, and detecting a faulty software program.

6. The apparatus of claim 5, wherein the apparatus comprises a diagnostic adapter card installed in an open slot on a PCI (Peripheral Component Interconnect) bus in the network computer and one or more wrap cables.

7. The diagnostic adapter card of claim 6, wherein the diagnostic adapter card includes a processing means to execute the diagnostic testing programs, a read only memory to boot the processing means, a random access memory to store diagnostic testing programs and data to be processed by the processing means, a first external connector to interface with a reporting device, and a second external connector to connect a wrap cable to send or receive sample data.

8. The diagnostic adapter card of claim 6, wherein an integrity of a first input/output port in the network computer and a second input/output port in the network computer is tested by connecting a wrap cable between the first input/output ports and the second input/output port.

9. The diagnostic adapter card of claim 8, wherein the diagnostic adapter card processing means sends a first set of data on a system bus to a device card for the first input/output port, the first set of data is sent via the wrap cable to the second input/output port, a device card for the second input/output port receives a signal as a second set of data, the device card for the second input/output port sends the second set of data back to the diagnostic adapter card on the system bus, and the processing means on diagnostic adapter card compares the first set of data with the second set of data to determine any errors.

10. The diagnostic adapter card of claim 8, wherein the wrap cable between the first input/output port and the second input/output port converts a format of the data without changing content of the data.

11. The diagnostic adapter card of claim 8, wherein the processing means for executing diagnostic testing programs includes executing a program to test one of bus timing, bus mastering, direct memory access operations, data and control registers associated with devices connected to the system bus, system memory, timeout functions, system processor sequencing, a boot flash monitor, and input/output integrity for one or more devices selected from a keyboard, a mouse, a graphics adapter, a serial port, a parallel port, a universal serial bus port, a microphone, a speaker, and an audio output port.

12. The disgnostic adapter card of claim 8, wherein the reporting means for reporting results includes one of sending data to a remote workstation, storing information in a log file, and displaying data on a display device connected to the diagnostic adapter card.

13. A computer program product for diagnosing a problem, the computer program product comprising:

instructions for diagnostic testing programs on a diagnostic adapter card;

instructions for reporting results from executing the diagnostic testing programs;

instructions for analyzing the results from executing the diagnostic testing programs to determine a cause of the problem, wherein analyzing the results from running the diagnostic testing programs includes one of detecting an absence of a response from a component, detecting a discrepancy between an expected response and an actual response, recognizing errors in signal timing, detecting a nonfunctioning component, detecting an intermittently failing component, and detecting a faulty software program.

14. The computer program product of claim 13, wherein instructions for executing diagnostic testing programs include instructions for executing an integrity test of a first input/output port and a second input/output port that are connected by a wrap cable between the first input/output port and the second input/output port.

15. The computer program product of claim 13, wherein the instructions for executing diagnostic testing programs includes executing a program to test one of bus timing, bus mastering, direct memory access operations, data and control registers associated with devices connected to the system bus, system memory, timeout functions, system processor sequencing, a boot flash monitor, and input/output integrity for one or more devices selected from a keyboard, a mouse, a graphics adapter, a serial port, a parallel port, a universal serial bus port, a microphone, a speaker, and an audio output port.

16. The computer program product of claim 13, wherein the instructions for reporting results includes one of sending data to a remote workstation, storing information in a log file, and displaying information on a display device connected to the diagnostic adapter card.

* * * * *